United States Patent
Yokota et al.

(10) Patent No.: US 10,958,122 B2
(45) Date of Patent: Mar. 23, 2021

(54) ROTATING ELECTRICAL MACHINE AND STATOR

(71) Applicant: AISIN AW CO., LTD., Anjo (JP)

(72) Inventors: Junichi Yokota, Nagoya (JP); Takahiro Odagi, Okazaki (JP)

(73) Assignee: AISIN AW CO., LTD., Anjo (JP)

( * ) Notice: Subject to any disclaimer, the term of this patent is extended or adjusted under 35 U.S.C. 154(b) by 507 days.

(21) Appl. No.: 15/743,457

(22) PCT Filed: Aug. 3, 2016

(86) PCT No.: PCT/JP2016/072743
§ 371 (c)(1),
(2) Date: Jan. 10, 2018

(87) PCT Pub. No.: WO2017/047264
PCT Pub. Date: Mar. 23, 2017

(65) Prior Publication Data
US 2018/0205278 A1    Jul. 19, 2018

(30) Foreign Application Priority Data

Sep. 18, 2015 (JP) .............................. JP2015-185225

(51) Int. Cl.
*H02K 3/28* (2006.01)
*H02K 21/16* (2006.01)
*H02K 1/14* (2006.01)
*H02K 29/03* (2006.01)
*H02K 1/16* (2006.01)
*H02K 3/12* (2006.01)

(52) U.S. Cl.
CPC ............... *H02K 3/28* (2013.01); *H02K 1/146* (2013.01); *H02K 1/16* (2013.01); *H02K 3/12* (2013.01); *H02K 21/16* (2013.01); *H02K 29/03* (2013.01); *H02K 2213/03* (2013.01)

(58) Field of Classification Search
CPC ............ H02K 3/28; H02K 1/146; H02K 1/16; H02K 3/12
See application file for complete search history.

(56) References Cited

U.S. PATENT DOCUMENTS

| | | | |
|---|---|---|---|
| 2003/0127942 A1* | 7/2003 | Nakamura | H02K 1/16 310/263 |
| 2010/0117465 A1 | 5/2010 | Kamiya et al. | |
| 2015/0222150 A1 | 8/2015 | Makita et al. | |

FOREIGN PATENT DOCUMENTS

| | | |
|---|---|---|
| DE | 83 25 441 U1 | 6/1985 |
| DE | 199 05 748 A1 | 8/1999 |
| EP | 0 433 479 A1 | 6/1991 |

(Continued)

OTHER PUBLICATIONS

Sep. 6, 2016 Search Report issued in International Patent Application No. PCT/JP2016/072743.

(Continued)

*Primary Examiner* — Terrance L Kenerly
(74) *Attorney, Agent, or Firm* — Oliff PLC (57) ABSTRACT

A rotating electrical machine that includes a rotor core having a permanent magnet placed therein; a stator core placed so as to face the rotor core in a radial direction and including a plurality of teeth and a plurality of slots each located between adjacent ones of the teeth; and a plurality of coils placed in the slots of the stator core.

14 Claims, 7 Drawing Sheets

(56) References Cited

FOREIGN PATENT DOCUMENTS

| | | |
|---|---|---|
| EP | 1 324 465 A2 | 7/2003 |
| JP | S54-66411 A | 5/1979 |
| JP | S54-97713 A | 8/1979 |
| JP | S56-153961 A | 11/1981 |
| JP | S57-122663 A | 7/1982 |
| JP | S62-244261 A | 10/1987 |
| JP | S64-50673 U | 3/1989 |
| JP | 2002-064949 A | 2/2002 |
| JP | 2010-115057 A | 5/2010 |
| WO | 2007/113436 A1 | 10/2007 |

OTHER PUBLICATIONS

May 3, 2018 Partial Supplementary Search Report issued in European Patent Application No. 16846137.4.

* cited by examiner

DIFFERENCE IN EFFECTIVE VALUE OF TORQUE

|  | WHEN NO CURRENT IS APPLIED |
|---|---|
| COMPARATIVE EXAMPLE | 7.7% |
| FIRST EMBODIMENT | 0.1% |

ROTATING ELECTRICAL MACHINE AND STATOR

BACKGROUND

The present disclosure relates to rotating electrical machines and stators.

Conventionally, rotating electrical machines and stators which include a plurality of teeth are known in the art. Such a rotating electrical machine and a stator are disclosed in, e.g., Japanese Patent Application Publication No. 2010-115057 (JP 2010-115057 A).

Conventional rotating electrical machines have a plurality of teeth. The plurality of teeth include same-phase teeth each having coils of the same phase placed in slots adjoining one side and the other side in the circumferential direction of the same-phase tooth, and different-phase teeth each having coils of different phases placed in slots adjoining one side and the other side in the circumferential direction of the different-phase tooth. When a current is supplied (applied) to the coils of each phase, the magnetic resistance of paths running from a rotor through the different-phase teeth is smaller than that of paths running from the rotor through the same-phase teeth. Accordingly, when a current is applied and the rotor is rotated, the amount of current magnetic flux that passes through the different-phase teeth, namely the amount of magnetic flux from permanent magnets of the rotor which passes through the different-phase teeth, is larger than the amount of current magnetic flux that passes through the same-phase teeth, namely the amount of magnetic flux from the permanent magnets of the rotor which passes through the same-phase teeth. Torque that is applied to the rotor therefore increases rapidly. That is, torque ripple is generated in the conventional rotating electrical machines.

As a solution to this, in the rotating electrical machine described in JP 2010-115057 A, the tip ends (corners) on the radially inner side of the different-phase teeth are chambered. The tip ends (corners) on the radially inner side of the same-phase teeth are not chambered. Since the tip ends on the radially inner side of the different-phase teeth are chambered, the length between the permanent magnet and the tip end on the radially inner side of the different-phase tooth is larger than the length between the permanent magnet and the tip end on the radially inner side of the same-phase tooth accordingly. As a result, when a current is applied, the magnetic resistance of the paths running from the rotor through the different-phase teeth is substantially the same as that of the paths running from the rotor through the same-phase teeth. Torque ripple can thus be reduced.

SUMMARY

The rotating electrical machine described in JP 2010-115057 A can reduce torque ripple that is generated when a current is supplied (applied) to the coils of each phase. However, this rotating electrical machine is disadvantageous in that, since the tip ends on the radially inner side of the same-phase teeth have a different shape (attraction to the magnets) from the tip ends on the radially inner side of the different-phase teeth, cogging torque (especially the sixth-order component of the electrical angle) is generated when no current is applied, namely when the magnetic resistance of the paths through which magnetic flux passes is the same between the same-phase teeth and the different-phase teeth.

An exemplary aspect of the present disclosure provides a rotating electrical machine and a stator which can reduce torque ripple that is generated when a current is applied and can also reduce cogging torque that is generated when no current is applied (cogging torque due to the sixth-order component of the electrical angle).

A rotating electrical machine according to a first aspect of the present disclosure includes: a rotor core having a permanent magnet placed therein; a stator core placed so as to face the rotor core in a radial direction and including a plurality of teeth and a plurality of slots each located between adjacent ones of the teeth; and a plurality of coils placed in the slots of the stator core. The plurality of teeth include a first tooth having the coils of the same phase placed in the slots adjoining one side and the other side in a circumferential direction of the first tooth, and a second tooth having the coils of different phases placed in the slots adjoining one side and the other side in the circumferential direction of the second tooth. A circumferential width of at least a part of such a portion of the second tooth that forms a magnetic path other than an opposing portion of the second tooth which faces the rotor core is smaller than a circumferential width of the first tooth at the same radial position. As used herein, the "same radial position" means that the distance from the rotation axis (rotation center) of the rotor core is the same.

In the rotating electrical machine according to the first aspect of the present disclosure, as described above, the plurality of teeth include the first tooth having the coils of the same phase placed in the slots adjoining the one side and the other side in the circumferential direction of the first tooth, and the second tooth having the coils of different phases placed in the slots adjoining the one side and the other side in the circumferential direction of the second tooth. The circumferential width of at least a part of such a portion of the second tooth that forms a magnetic path other than the opposing portion of the second tooth which faces the rotor core is smaller than the circumferential width of the first tooth at the same radial position. Since the circumferential width of a part of such a portion of the second tooth that forms a magnetic path is smaller than the circumferential width of the first tooth, magnetic resistance of a path running from the permanent magnet of the rotor core through the second tooth is increased accordingly. The magnetic resistance of the path running from the permanent magnet of the rotor core through the second tooth can thus be made substantially the same as that of a path running from the rotor core through the first tooth. Accordingly, torque ripple that is generated when a current is applied can be reduced. The portion with a reduced width is formed in the part of the tooth other than the opposing portion located on the radially inner side of the tooth. In this case, as opposed to the case where a tip end (opposing portion) located on the radially inner side of the second tooth, namely a part of the second tooth which is located relatively close to the permanent magnet and has relatively high magnetic flux density from the permanent magnet, is chamfered, the portion with a reduced width is formed in a part of the second tooth which is located relatively far away from the permanent magnet and has relatively low magnetic flux density from the permanent magnet. The influence of a groove (the influence due to the difference in shape between the first tooth and the second tooth) is therefore small. Accordingly, as opposed to the case where the tip end located on the radially inner side of the second tooth, namely the part of the second tooth which has relatively high magnetic flux density from the permanent magnet, is chamfered, cogging torque that is generated when no current is applied (cogging torque due to a sixth-order component of an electrical angle) can be reduced. As a result, torque ripple that is generated when a current is applied is reduced, and cogging torque that is generated when no current is applied (cogging torque due to the sixth-order component of the electrical angle) can also be reduced.

A rotating electrical machine according to a second aspect of the present disclosure includes: a rotor core having a permanent magnet placed therein; a stator core placed so as to face the rotor core in a radial direction and including a plurality of teeth and a plurality of slots each located between adjacent ones of the teeth; and a plurality of coils placed in the slots of the stator core. The plurality of teeth include a first tooth having the coils of the same phase placed in the slots adjoining one side and the other side in a circumferential direction of the first tooth, and a second tooth having the coils of different phases placed in the slots adjoining one side and the other side in the circumferential direction of the second tooth. An opposing portion of the first tooth which faces the rotor core and an opposing portion of the second tooth which faces the rotor core have substantially the same shape. The first tooth and the second tooth have substantially the same magnetic resistance when a current is applied to the coils.

In the rotating electrical machine according to the second aspect of the present disclosure, as described above, the opposing portion of the first tooth which faces the rotor core and the opposing portion of the second tooth which faces the rotor core have substantially the same shape. The first tooth and the second tooth have substantially the same magnetic resistance when a current is applied to the coils. This configuration can reduce torque ripple that is generated when a current is applied. Since the opposing portion of the first tooth which faces the rotor core and the opposing portion of the second tooth which faces the rotor core have substantially the same shape, the influence due to the difference in shape between the first tooth and the second tooth is small, as opposed to the case where the tip end (opposing portion) located on the radially inner side of the second tooth, namely the part of the second tooth which is located relatively close to the permanent magnet and has relatively high magnetic flux density from the permanent magnet, is chamfered. Accordingly, as opposed to the case where the tip end located on the radially inner side of the second tooth, namely the part of the second tooth which has relatively high magnetic flux density from the permanent magnet, is chamfered, cogging torque that is generated when no current is applied (cogging torque due to the sixth-order component of the electrical angle) can be reduced. As a result, torque ripple that is generated when a current is applied is reduced, and cogging torque that is generated when no current is applied (cogging torque due to the sixth-order component of the electrical angle) can also be reduced.

A stator according to a third aspect of the present disclosure includes: a stator core that is placed so as to face in a radial direction a rotor core having a permanent magnet placed therein and that includes a plurality of teeth and a plurality of slots each located between adjacent ones of the teeth; and a plurality of coils placed in the slots of the stator core. The plurality of teeth include a first tooth having the coils of the same phase placed in the slots adjoining one side and the other side in a circumferential direction of the first tooth, and a second tooth having the coils of different phases placed in the slots adjoining one side and the other side in the circumferential direction of the second tooth, and a circumferential width of at least a part of such a portion of the second tooth that forms a magnetic path other than an opposing portion of the second tooth which faces the rotor core is smaller than a circumferential width of the first tooth at the same radial position.

In the stator according to the third aspect of the present disclosure, as described above, the plurality of teeth include the first tooth having the coils of the same phase placed in the slots adjoining the one side and the other side in the circumferential direction of the first tooth, and the second tooth having the coils of different phases placed in the slots adjoining the one side and the other side in the circumferential direction of the second tooth. The circumferential width of at least a part of such a portion of the second tooth that forms a magnetic path other than the opposing portion of the second tooth which faces the rotor core is smaller than the circumferential width of the first tooth at the same radial position. Since the circumferential width of a part of such a portion of the second tooth that forms a magnetic path is smaller than the circumferential width of the first tooth, magnetic resistance of a path running from the permanent magnet of the rotor core through the second tooth is increased accordingly. The magnetic resistance of the path running from the permanent magnet of the rotor core through the second tooth can thus be made substantially the same as that of a path running from the rotor core through the first tooth. Accordingly, torque ripple that is generated when a current is applied can be reduced. The portion with a reduced width is formed in the part of the tooth other than the opposing portion located on the radially inner side of the tooth. In this case, as opposed to the case where a tip end (opposing portion) located on the radially inner side of the second tooth, namely a part of the second tooth which is located relatively close to the permanent magnet and has relatively high magnetic flux density from the permanent magnet, is chamfered, the portion with a reduced width is formed in a part of the second tooth which is located relatively far away from the permanent magnet and has relatively low magnetic flux density from the permanent magnet. The influence of a groove (the influence due to the difference in shape between the first tooth and the second tooth) is therefore small. Accordingly, as opposed to the case where the tip end located on the radially inner side of the second tooth, namely the part of the second tooth which has relatively high magnetic flux density from the permanent magnet, is chamfered, cogging torque that is generated when no current is applied (cogging torque due to a sixth-order component of an electrical angle) can be reduced. As a result, a stator can be provided which can reduce torque ripple that is generated when a current is applied and can also reduce cogging torque that is generated when no current is applied (cogging torque due to the sixth-order component of the electrical angle).

According to the present disclosure, as described above, torque ripple that is generated when a current is applied is reduced, and cogging torque that is generated when no current is applied (cogging torque due to the sixth-order component of the electrical angle) can also be reduced.

DETAILED DESCRIPTION OF EMBODIMENTS

Embodiments of the present disclosure will be described below based on the accompanying drawings.

First Embodiment (Structure of Rotating Electrical Machine)

The structure of a rotating electrical machine 100 according to a first embodiment will be described with reference to FIGS. 1 to 4.

Figure 1:
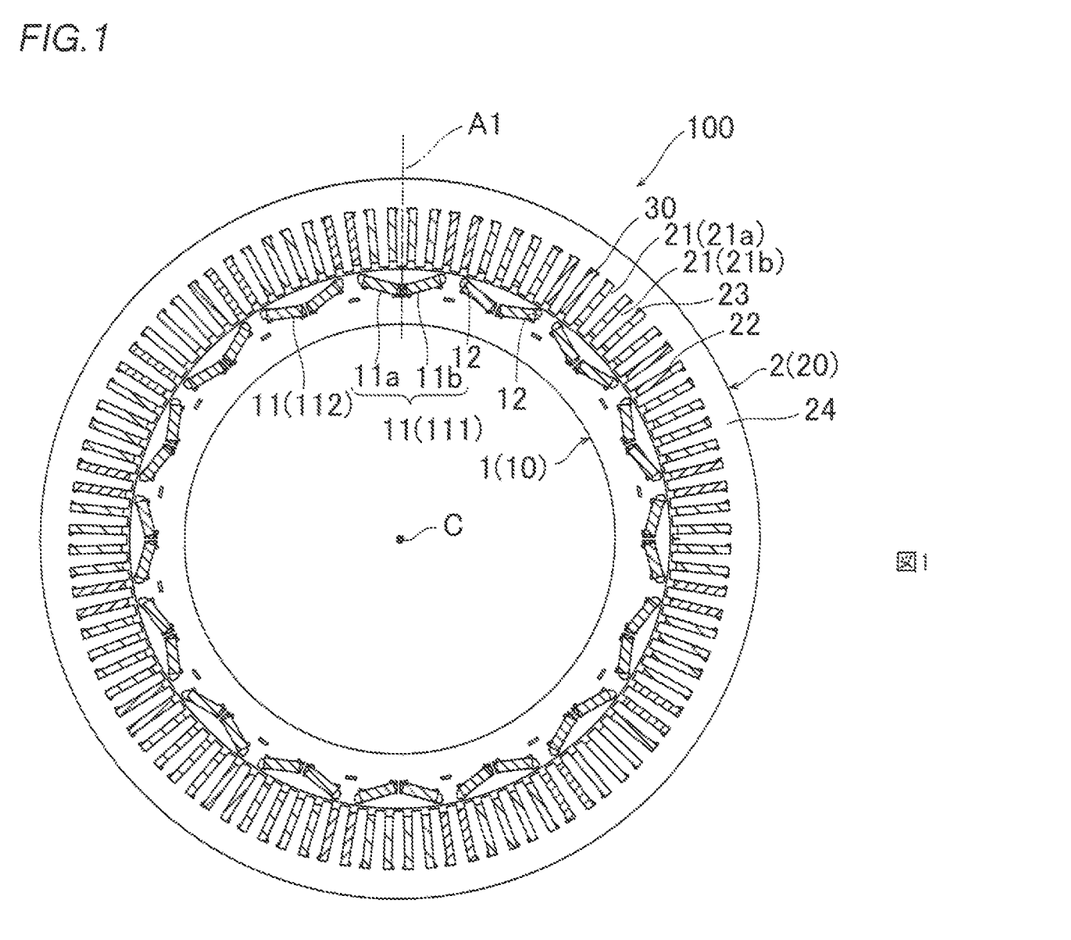
FIG. 1 is a top view of a rotating electrical machine according to a first embodiment of the present disclosure.

As shown in FIG. 1, the rotating electrical machine 100 includes a rotor core 10 (rotor 1) and a stator core 20 (stator 2).

The rotor core 10 has permanent magnets 11 placed therein. Regarding the permanent magnets 11, a single magnetic pole is formed by a pair of permanent magnets 11a, 11b. The permanent magnets 11a, 11b are disposed substantially symmetrically with respect to line segment A1 extending in the radial direction, as viewed in a rotation axis direction. The permanent magnets 11 include permanent magnets 111 having an N-pole on their radially outer side (the B1 direction side in FIG. 2) and an S-pole on their radially inner side (the B2 direction side in FIG. 2), and permanent magnets 112 having an S-pole on their radially outer side and an N-pole on their radially inner side. The permanent magnets 111 and the permanent magnets 112 are alternately arranged in the circumferential direction. The expression "as viewed in the rotation axis direction" means viewing in the direction of a rotation axis C (see FIG. 1) about which the rotor (not shown) rotates.

The rotor core 10 has through holes 12 formed on both sides in the circumferential direction of the permanent magnets 11a, 11b so as to extend through the rotor core 10 in the rotation axis direction from one end face to the other end face of the rotor core 10.

The rotor core 10 has the plurality of (in the first embodiment, 16) permanent magnets 11 placed therein. That is, the number of poles is 16.

The stator core 20 is disposed so as to face the rotor core 10 in the radial direction. The stator core 20 includes a plurality of (in the first embodiment, 96) teeth 21 and a plurality of (in the first embodiment, 96) slots 22 each located between adjacent ones of the teeth 21.

Figure 2:
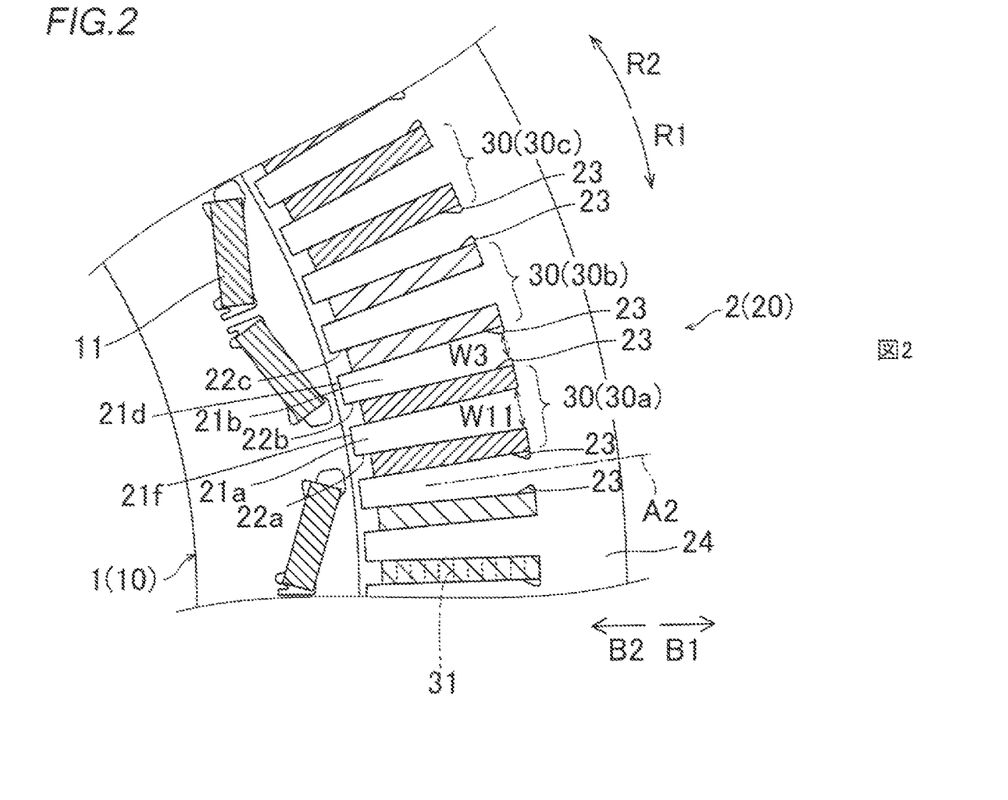
FIG. 2 is a partial enlarged view of FIG. 1.

Coils 30 are placed in the plurality of slots 22. The coils 30 are concentric winding coils each formed by winding a rectangular wire 31 (see FIG. 2). The coils 30 are wound in the slots 22 that are formed adjacent to each other in the circumferential direction. As shown in FIG. 2, the coils 30 include coils of three phases, namely coils 30a (U-phase), coils 30b (V-phase), and coils 30c (W-phase).

As shown in FIG. 2, the plurality of teeth 21 include a first tooth 21a having the coils 30 of the same phase placed in the slots 22 adjoining one side and the other side in the circumferential direction of the first tooth 21a, and a second tooth 21b having the coils 30 of different phases placed in the slots 22 adjoining one side and the other side in the circumferential direction of the second tooth 21b. The expression "having the coils 30 of the same phase placed in the slots 22 adjoining one side and the other side in the circumferential direction of the first tooth 21a" means that the coils 30 of the same phase are placed (the U-phase coils 30a, the V-phase coils 30b, or the W-phase coils 30c are placed) in the slots 22 adjoining one side and the other side in the circumferential direction of the first tooth 21a. The expression "having the coils 30 of different phases placed in the slots 22 adjoining one side and the other side in the circumferential direction of the second tooth 21b" means that, in the case where the U-phase, W-phase, or W-phase coil 30 is placed in the slot 22 adjoining one side in the circumferential direction of the second tooth 21b, the coil 30 of a phase other than the phase of the coil 30 placed in the slot 22 adjoining the one side in the circumferential direction of the second tooth 21b is placed in the slot 22 adjoining the other side in the circumferential direction of the second tooth 21b. For example, the U-phase coils 30a are placed in the slots 22a, 22b adjoining one side (the R1 direction side) and the other side (the R2 direction side) in the circumferential direction of the first tooth 21a. The U-phase coil 30a is placed in the slot 22b located on one side in the circumferential direction (the R1 direction side) of the second tooth 21b, and the V-phase coil 30b is placed in the slot 22c located on the other side in the circumferential direction (the R2 direction side) of the second tooth 21b.

Figure 3:
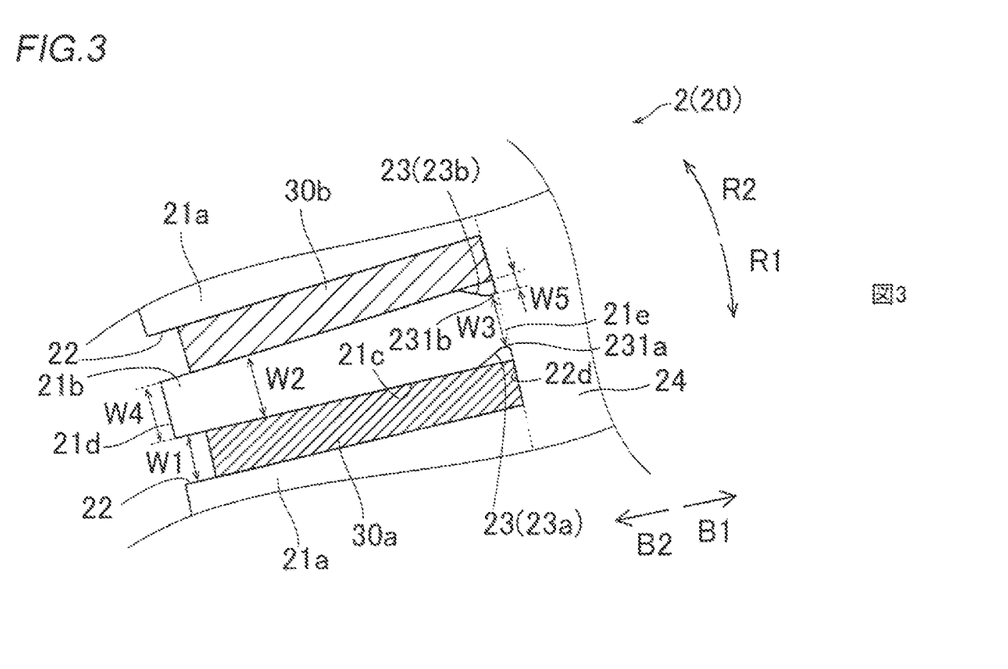
FIG. 3 is a partial enlarged view of FIG. 2.

As shown in FIG. 3, each slot 22 in which the coil 30 formed by winding a rectangular wire 31 (see FIG. 2) is placed has a circumferential width W1 that is substantially uniform from the radially inner side to the radially outer side of the slot 22. Since the circumferential width W1 of each slot 22 is substantially uniform from the radially inner side to the radially outer side of the slot 22, the circumferential width W2 of each tooth 21 adjoining the slot 22 gradually increases from the radially inner side toward the radially outer side of the tooth 21.

In the first embodiment, as shown in FIG. 2, the circumferential width W3 of at least a part of such a portion of the second tooth 21b that forms a magnetic path other than a tip end 21d facing the rotor core 10 is smaller than the circumferential width W11 of the first tooth 21a at the same radial position. Specifically, the circumferential width W3 of a part of the second tooth 21b which has grooves 23 described below is smaller than the circumferential width W11 of the first tooth 21a at the same radial position. The circumferential width of the second tooth 21b other than the part having the grooves 23 is substantially the same as the circumferential width of the first tooth 21a at the same radial position. The tip end 21d is an example of the "opposing portion (of the second tooth)."

In the first embodiment, the grooves 23 extending in the rotation axis direction are formed in at least a part of each side surface 21c of the tooth 21 other than the tip end 21d located on the radially inner side of the tooth 21. The side surfaces 21c are each located on the slot 22 side (the side in the circumferential direction) of the tooth 21. The grooves 23 are not formed in the first tooth 21a but are formed in the second tooth 21b. The stator core 20 has a plurality of the first teeth 21a and a plurality of the second teeth 21b. The grooves 23 are not formed in any of the plurality of first teeth 21a but are formed in all of the plurality of second teeth 21b.

In the first embodiment, the grooves 23 are formed in radially outer parts of the second teeth 21b. Specifically, the stator core 20 includes a back yoke 24 located on the radially outer side of the stator core 20. The teeth 21 are formed so as to extend radially inward from the back yoke 24. The back yoke 24 is a part of the stator core 20 which is located outside a dashed line in FIG. 3 in the radial direction. The grooves 23 are formed in root parts 21e of the second teeth 21b which connect to the back yoke 24, and are formed so as not to extend in the back yoke 24 as viewed in the rotation axis direction. The grooves 23 communicate with the slots 22. The grooves 23 are formed so as to extend in the circumferential direction from near radially outer ends 22d of the slots 22 as viewed in the rotation axis direction.

In the first embodiment, the grooves 23 are formed on both one side (the R1 direction side) and the other side (the R2 direction side) in the circumferential direction of the second tooth 21b as viewed in the rotation axis direction. That is, a groove 23a is formed on one side in the circumferential direction (the R1 direction side) of the second tooth 21b, and a groove 23b is formed on the other side in the circumferential direction (the R2 direction side) of the second tooth 21b. The groove 23a and the groove 23b are shaped substantially symmetrically with respect to line segment A2 extending in the radial direction, as viewed in the rotation axis direction.

In the first embodiment, in each of those parts of the second teeth 21b which have the grooves 23, the circumferential width W3 of the part of the second tooth 21b which has the grooves 23 is equal to or larger than the circumferential width W4 of the tip end 21d located on the radially inner side of the second tooth 21b (W3≥W4), as viewed in the rotation axis direction. Specifically, the circumferential width W3 from an end 231a located on the R2 direction side of the groove 23a to an end 231b located on the R1 direction side of the groove 23b (the smallest width between the grooves 23a, 23b) is equal to or larger than the circumferential width W4 of the tip end 21d located on the radially inner side of the second tooth 21b.

In the first embodiment, the grooves 23 are formed so that the circumferential width W5 of the groove 23 increases (gradually increases) from the radially inner side toward the radially outer side of the groove 23, as viewed in the rotation axis direction. That is, the width W5 is the smallest at the radially inner end of the groove 23 and is the largest at the radially outer end of the groove 23. The grooves 23 have a substantially triangular shape as viewed in the rotation axis direction.

Figure 4:
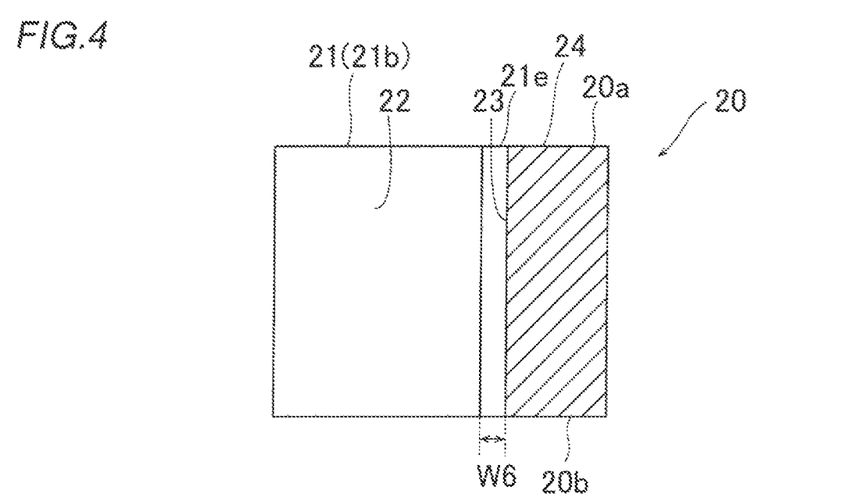
FIG. 4 is a sectional view of a stator core according to the first embodiment of the present disclosure.

In the first embodiment, the grooves 23 are formed in the root parts 21e of the second teeth 21b which connect to the back yoke 24, and are formed so as not to extend in the back yoke 24 as viewed in the rotation axis direction, and as shown in FIG. 4, so as to extend through the stator core 20 from one end face 20a to the other end face 20b in the rotation axis direction of the stator core 20. The grooves 23 have a width W6 that is substantially uniform in the rotation axis direction.

In the first embodiment, as shown in FIG. 2, tip ends 21f of the first teeth 21a which face the rotor core 10 and the tip ends 21d of the second teeth 21b which face the rotor core 10 have substantially the same shape. The first teeth 21a and the second teeth 21b have substantially the same magnetic resistance when a current is applied to the coils 30. Specifically, the circumferential width W3 of at least a part of such a portion of the second tooth 21b that forms a magnetic path other than the tip end 21d facing the rotor core 10 is made smaller than the circumferential width W11 of the first tooth 21a at the same radial position. Accordingly, the first teeth 21a and the second teeth 21b have substantially the same magnetic resistance when a current is applied to the coils 30. Specifically, the circumferential width W3 at a radial position of the part of the second tooth 21b which has the grooves 23 is made smaller than the circumferential width W11 of the first tooth 21a at the same radial position. Accordingly, the first teeth 21a and the second teeth 21b have substantially the same magnetic resistance when a current is applied to the coils 30. The tip end 21f is an example of the "opposing portion (of the first tooth)."

(Simulation)

Simulation conducted to confirm that cogging torque that is generated when no current is applied is reduced by the grooves 23 of the first embodiment will be described in comparison with a rotating electrical machine 300 according to a comparative example.

Figure 5:
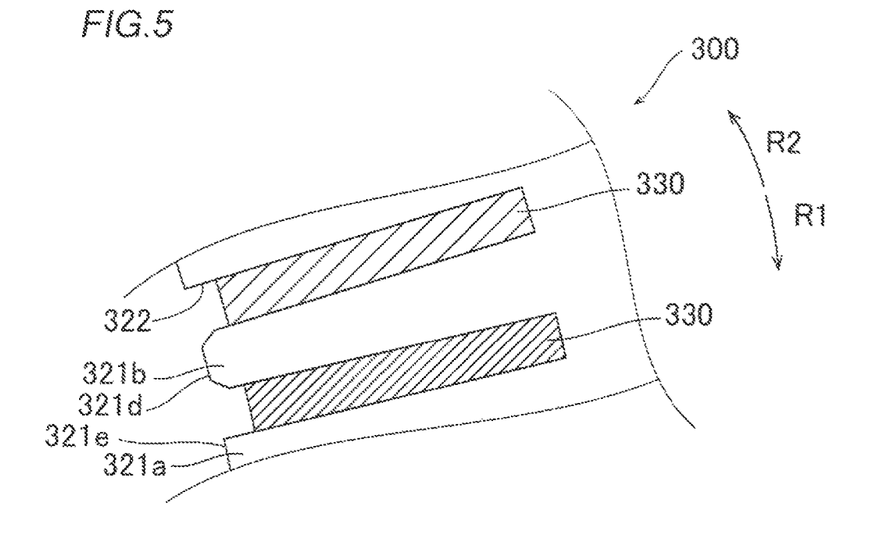
FIG. 5 is a top view of a rotating electrical machine according to a comparative example.

As shown in FIG. 5, in the rotating electrical machine 300 according to the comparative example, second teeth 321b each having coils 330 of different phases placed in slots 322 adjoining the second tooth 321b have chamfered tip ends 321d on their radially inner side. First teeth 321a each having coils 330 of the same phase placed in slots 322 adjoining the first tooth 321a have non-chamfered angular tip ends 321e on their radially inner side.

(Cogging Torque That Is Generated When No Current Is Applied)

Figure 6:
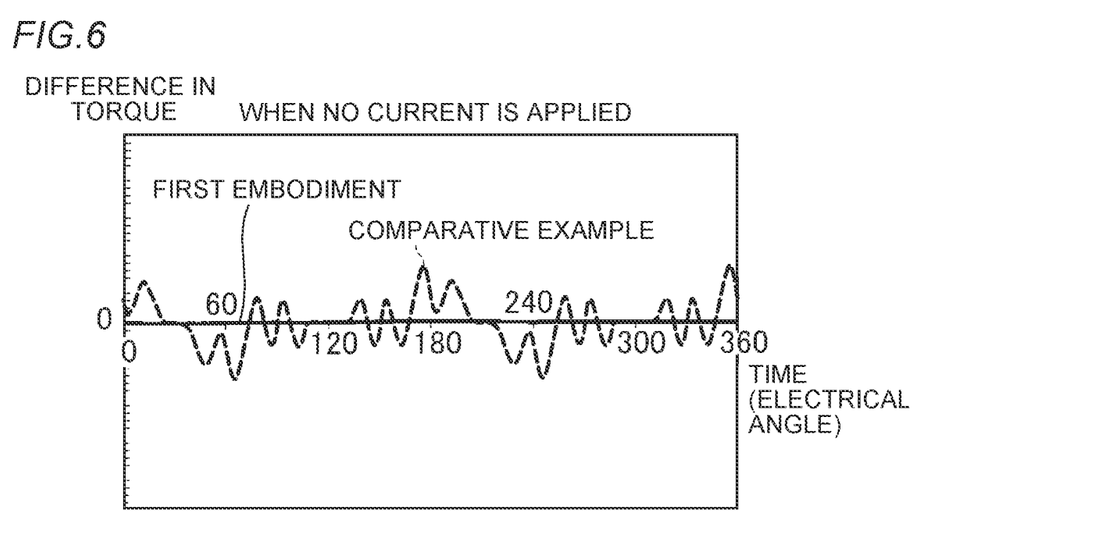
FIG. 6 is a diagram showing the difference in torque with respect to time (electrical angle).

In FIG. 6, the abscissa represents time (electrical angle) and the ordinate represents the difference between torque applied to the first teeth 21a (first teeth 321a) and torque applied to the second teeth 21b (second teeth 321b). As shown in FIG. 6, it was confirmed that, in the rotating electrical machine 300 according to the comparative example, the difference in torque fluctuates to positive or negative values with time (electrical angle). That is, it was confirmed that, in the rotating electrical machine 300 according to the comparative example, cogging torque is generated when no current is applied. On the other hand, it was confirmed that, in the rotating electrical machine 100 according to the first embodiment, the difference in torque is substantially zero regardless of the passage of time (electrical angle). That is, it was confirmed that cogging torque that is generated when no current is applied is reduced in the rotating electrical machine 100 according to the first embodiment.

Figure 7:
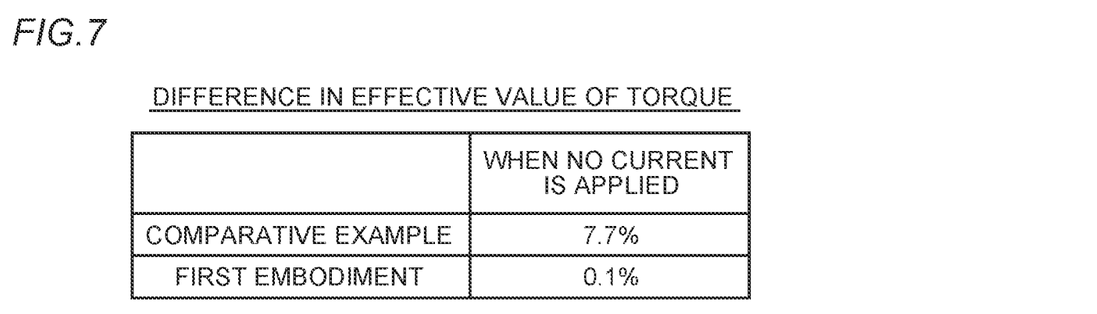
FIG. 7 is a diagram showing the difference in effective value of torque when no current is applied.

FIG. 7 shows the difference between the effective value of torque applied to the first teeth 21a (first teeth 321a) and the effective value of torque applied to the second teeth 21b (second teeth 321b). As shown in FIG. 7, it was confirmed that the difference in effective value is 7.7% in the rotating electrical machine 300 according to the comparative example, but is 0.1% in the rotating electrical machine 100 according to the first embodiment. That is, it was confirmed that, even in terms of the effective values, cogging torque that is generated when no current is applied is reduced in the rotating electrical machine 100 according to the first embodiment.

Figure 8:
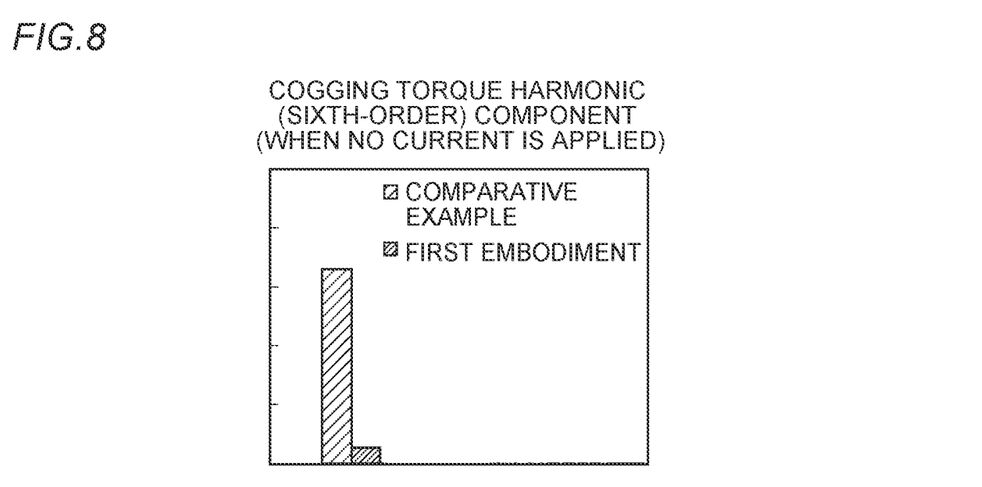
FIG. 8 is a diagram showing a harmonic (sixth-order) component of cogging torque.

FIG. 8 shows the sixth-order harmonic component out of harmonic components of cogging torque. As shown in FIG. 8, it was confirmed that the sixth-order harmonic component is relatively large in the rotating electrical machine 300 according to the comparative example, whereas the sixth-order harmonic component is significantly reduced in the rotating electrical machine 100 according to the first embodiment as compared to the rotating electrical machine 300 according to comparative example.

Figure 9:
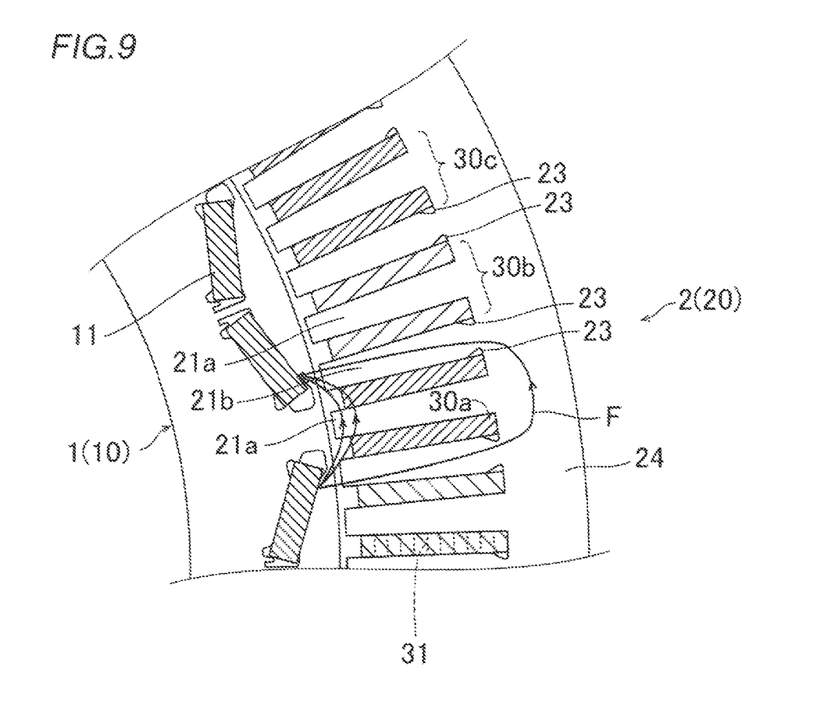
FIG. 9 is a diagram showing magnetic flux paths.

The reason why cogging torque is reduced by the grooves 23 is as follows. In rotating electrical machines, cogging torque that is generated when no current is applied is usually considered to be due to the difference in shape between first and second teeth. As shown in FIG. 9, magnetic flux (F) generated from the permanent magnet 11 passes through the tip end 21d on the radially inner side of the tooth 21 and through the radially outer part of the tooth 21. Of the magnetic flux generated from the permanent magnet 11, the magnetic flux passing through the tip end 21d on the radially inner side of the tooth 21 is denser than that passing through the radially outer part of the tooth 21. Accordingly, in the case where the tip ends 321d located on the radially inner side of the second teeth 321b, namely the portions of the second teeth 321b where the magnetic flux density is relatively high, are chamfered as in the rotating electrical machine 300 according to the comparative example, the difference between torque that is generated due to the magnetic flux passing through the second teeth 321b when no current is applied and torque that is generated due to the magnetic flux passing through the first teeth 321a when no current is applied is increased because the magnetic flux density is higher in the tip ends 321d. On the other hand, in the rotating electrical machine 100 according to the first embodiment, the grooves 23 are formed in the root parts 21e (on the radially outer side) of the second teeth 21b. The magnetic flux density is relatively lower in the root parts 21e of the second teeth 21b than in the tip ends 21d located on the radially inner side of the second teeth 21b. That is, the difference between torque that is generated due to the magnetic flux passing through the second teeth 21b when no current is applied and torque that is generated due to the magnetic flux passing through the first teeth 21a when no current is applied is reduced because the magnetic flux density is lower in the root parts 21e. Cogging torque that is generated when no current is applied is thus reduced in the rotating electrical machine 100 according to the first embodiment as compared to the rotating electrical machine 300 according to the comparative example.

(Torque Ripple)

Simulation of torque ripple that is generated when a current is applied is also conducted for the rotating electrical machine 100 according to the first embodiment and the rotating electrical machine 300 according to the comparative example. As a result, it was confirmed that torque ripple is reduced in both the rotating electrical machine 100 according to the first embodiment and the rotating electrical machine 300 according to the comparative example, as compared to the case where the second teeth have neither non-chamfered tip ends nor grooves (that is, have the same shape as the first teeth).

(Effects of First Embodiment)

The first embodiment has the following effects.

In the first embodiment, as described above, the plurality of teeth 21 include a first tooth 21a having the coils 30 of the same phase placed in the slots 22 adjoining one side and the other side in the circumferential direction of the first tooth 21a, and a second tooth 21b having the coils 30 of different phases placed in the slots 22 adjoining one side and the other side in the circumferential direction of the second tooth 21b. The circumferential width W3 of at least a part of such a portion of the second tooth 21b that forms a magnetic path other than the tip end 21d facing the rotor core 10 is smaller than the circumferential width W11 of the first tooth 21a at the same radial position. Since the circumferential width W3 of a part of such a portion of the second tooth 21b that forms a magnetic path is smaller than the circumferential width W11 of the first tooth 21a, the magnetic resistance of the paths running from the permanent magnets 11 of the rotor core 10 through the second teeth 21b is increased accordingly. The magnetic resistance of the paths running from the permanent magnets 11 of the rotor core 10 through the second teeth 21b can thus be made substantially the same as that of the paths running from the rotor core 10 through the first teeth 21a. Accordingly, torque ripple that is generated when a current is applied can be reduced. The portions with a reduced width (grooves 23) are formed in the parts of the teeth 21 other than the tip ends 21d located on the radially inner side of the teeth 21. In this case, as opposed to the case where the tip ends 21d located on the radially inner side of the second teeth 21b, namely those parts of the second teeth 21b which are located relatively close to the permanent magnets 11 and have relatively high magnetic flux density from the permanent magnets 11, are chamfered, the portions with a reduced width (grooves 23) are formed in those parts of the second teeth 21b which are located relatively far away from the permanent magnets 11 and have relatively low magnetic flux density from the permanent magnets 11. The influence of the grooves 23 (the influence due to the difference in shape between the first teeth 21a and the second teeth 21b) is therefore small. Accordingly, as opposed to the case where the tip ends 21d located on the radially inner side of the second teeth 21b, namely those parts of the second teeth 21b which have relatively high magnetic flux density from the permanent magnets 11, are chamfered, cogging torque that is generated when no current is applied (cogging torque due to the sixth-order component of the electrical angle) can be reduced. As a result, torque ripple that is generated when a current is applied is reduced, and cogging torque that is generated when no current is applied (cogging torque due to the sixth-order component of the electrical angle) can also be reduced.

In the first embodiment, the grooves 23 extending in the rotation axis direction are formed in at least a part of each side surface 21c of the tooth 21 other than the tip end 21d located on the radially inner side of the tooth 21. The side surfaces 21c are each located on the slot 22 side of the tooth 21. The grooves 23 are not formed in the first teeth 21a but are formed in the second teeth 21b. Since the grooves 23 are formed, the magnetic resistance of the paths running from the permanent magnets 11 of the rotor core 10 through the second teeth 21b is increased accordingly. The magnetic resistance of the paths running from the permanent magnets 11 of the rotor core 10 through the second teeth 21b can thus be easily made substantially the same as that of the paths running from the rotor core 10 through the first teeth 21a.

In the first embodiment, as described above, the grooves 23 are formed in the radially outer parts of the second teeth 21b. Since the distance between the groove 23 and the permanent magnet 11 is relatively large, the influence of the grooves 23 (the influence due to the difference in shape between the first teeth 21a and the second teeth 21b) can further be reduced. As a result, cogging torque that is generated when no current is applied can further be reduced.

In the first embodiment, as described above, in each of those parts of the second teeth 21b which have the grooves 23, the circumferential width W3 of the part of the second tooth 21b which has the grooves 23 is equal to or larger than the circumferential width W4 of the tip end 21d located on the radially inner side of the second tooth 21b, as viewed in the rotation axis direction. In this case, as opposed to the case where the circumferential width W3 of the part of the second tooth 21b which has the grooves 23 is smaller than the circumferential width W4 of the tip end 21d located on the radially inner side of the second tooth 21b, it is ensured that the magnetic flux paths from the permanent magnets 11 have a sufficient width (magnetic saturation is less likely to occur). This can prevent reduction in torque of the rotating electrical machine 100.

In the first embodiment, as described above, the grooves 23 (23a, 23b) are formed on both one side and the other side in the circumferential direction of each of the second teeth 21b, as viewed in the rotation axis direction. This allows the magnetic flux to pass between the grooves 23a, 23b (near the middle part in the circumferential direction of the second tooth 21b). This can prevent the grooves 23 from blocking the path of the magnetic flux (magnetic path).

In the first embodiment, as described above, the grooves 23 are formed in the root parts 21e of the second teeth 21b which connect to the back yoke 24, and are formed so as not to extend in the back yoke 24 as viewed in the rotation axis direction. This can prevent the grooves 23 from blocking the magnetic flux passing through the back yoke 24, as opposed to the case where the grooves 23 extend in the back yoke 24. As a result, reduction in torque of the rotating electrical machine 100 can be prevented.

In the first embodiment, as described above, the grooves 23 are formed in the root parts 21e of the second teeth 21b which connect to the back yoke 24, and are formed so as not to extend in the back yoke 24 as viewed in the rotation axis direction and so as to extend through the stator core 20 from the one end face 20a to the other end face 20b in the rotation axis direction of the stator core 20. The magnetic resistance of the paths running from the rotor core 10 through the second teeth 21b can thus be increased along the length from the one end face 20a to the other end face 20b in the rotation axis direction of the stator core 20. As a result, torque ripple that is generated when a current is applied can be effectively reduced.

In the first embodiment, as described above, the grooves 23 are formed so that the circumferential width W5 of the grooves 23 increases from the radially inner side toward the radially outer side of the groove 23, as viewed in the rotation axis direction. Those parts of the grooves 23 which have larger circumferential widths W are thus located at the positions (radially further outer positions) relatively far away from the permanent magnets 11 and having relatively low magnetic flux density from the permanent magnets 11. This can further reduce the influence of the grooves 23 (the influence due to the difference in shape between the first teeth 21a and the second teeth 21b), whereby cogging torque that is generated when no current is applied can further be reduced.

In the first embodiment, as described above, the tip ends 21f of the first teeth 21a which face the rotor core 10 and the tip ends 21d of the second teeth 21b which face the rotor core 10 have substantially the same shape. The first teeth 21a and the second teeth 21b have substantially the same magnetic resistance when a current is applied to the coils 30. This configuration can reduce the influence due to the difference in shape between the first teeth 21a and the second teeth 21b, as opposed to the case where the tip ends 21d located on the radially inner side of the second teeth 21b, namely those parts of the second teeth 21b which are located relatively close to the permanent magnets 11 and have relatively high magnetic flux density from the permanent magnets 11, are chamfered.

Second Embodiment (Structure of Rotating Electrical Machine)

Figure 10:
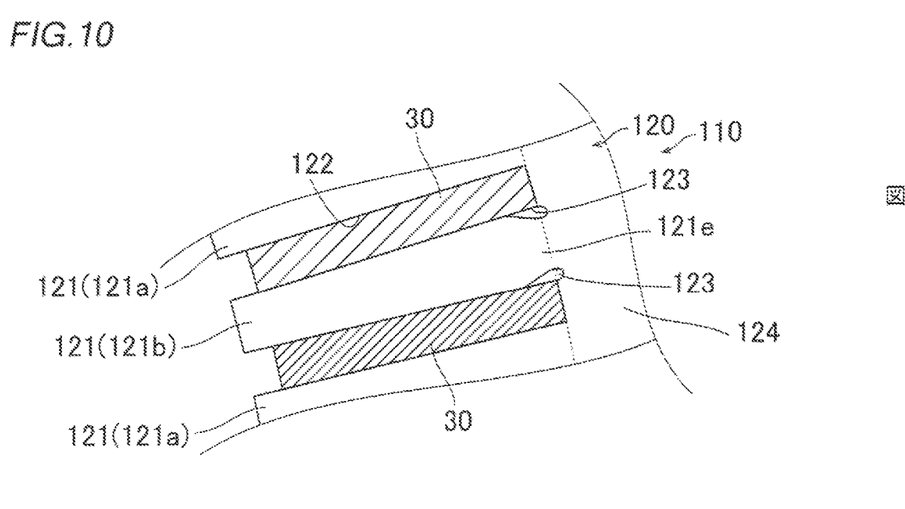
FIG. 10 is a top view of a rotating electrical machine according to a second embodiment of the present disclosure.

The structure of a rotating electrical machine 110 according to a second embodiment will be described with reference to FIGS. 10 and 11. In the second embodiment, grooves 123 are formed so as to extend in a back yoke 124 as viewed in the rotation axis direction, unlike the first embodiment in which the grooves 23 are formed so as not to extend in the back yoke 24 as viewed in the rotation axis direction.

Figure 11:
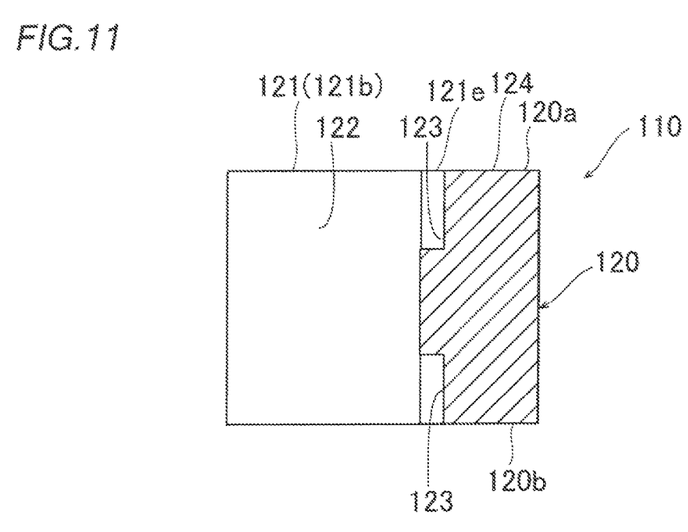
FIG. 11 is a sectional view of a stator core according to the second embodiment of the present disclosure.

As shown in FIG. 11, a stator core 120 includes teeth 121 and slots 122. The teeth 121 include first teeth 121a each having the coils 30 of the same phase placed in the slots 122 adjoining one side and the other side in the circumferential direction of the first tooth 121a, and second teeth 121b each having the coils 30 of different phases placed in the slots 22 adjoining one side and the other side in the circumferential direction of the second tooth 121b. The second teeth 121b have the grooves 123.

The stator core 120 includes the back yoke 124 located on the radially outer side of the stator core 120. The teeth 21 are formed so as to extend radially inward from the back yoke 124. In the second embodiment, the grooves 123 are formed in root parts 121e of the second teeth 121b which connect to the back yoke 124, and are formed so as to extend in the back yoke 124 as viewed in the rotation axis direction. Specifically, the grooves 123 are formed so as to extend in both the root parts 121e of the second teeth 121b and the back yoke 124.

In the second embodiment, the grooves 123 are formed in the root parts 121e of the second teeth 121b which connect to the back yoke 124, and are formed so as to extend in the back yoke 24 as viewed in the rotation axis direction, and as shown in FIG. 11, so as not to extend through the stator core 120 from one end face 120a to the other end face 120b in the rotation axis direction of the stator core 120. Specifically, the grooves 123 are formed on the one end face 120a side in the rotation axis direction of the stator core 120 and the other end face 120b side in the rotation axis direction of the stator core 120 so that the grooves 123 are separate from each other, and no groove 123 is not formed in a region near the middle part in the rotation axis direction of the stator core 120.

The configuration of the second embodiment is otherwise similar to that of the first embodiment.

(Effects of Second Embodiment)

The second embodiment has the following effects.

In the second embodiment, as described above, the grooves 123 are formed in the root parts 121e of the second teeth 121b which connect to the back yoke 124, and are formed so as to extend in the back yoke 124 as viewed in the rotation axis direction. Since the grooves 123 extend in the back yoke 124, the grooves 123 have a larger size. This can reduce torque ripple that is generated when a current is applied and cogging torque that is generated when no current is applied, and also makes it easier to place between the slot 122 (groove 123) and the coil 30 varnish for fixing the coils 30.

In the second embodiment, as described above, the grooves 123 are formed in the root parts 121e of the second teeth 121b which connect to the back yoke 124, and are formed so as to extend in the back yoke 124 as viewed in the rotation axis direction and so as not to extend through the stator core 120 from the one end face 120a to the other end face 120*b* in the rotation axis direction of the stator core 120. This prevents the varnish placed between the slot 122 (groove 123) and the coil 30 from dropping (falling) from the stator core 120, as opposed to the case where the grooves 123 are formed so as to extend through the stator core 120 from the one end face 120*a* to the other end face 120*b* in the rotation axis direction of the stator core 120.

[Modifications]

The embodiments disclosed herein are merely by way of example in all respects and should not be construed as restrictive. For example, the first and second embodiments are described with respect to an example in which the grooves are formed in the second teeth so that the circumferential width of the second teeth is smaller than that of the first teeth at the same radial position. However, the present disclosure is not limited to this. In the present disclosure, the circumferential width of the second teeth may be made smaller than the circumferential width of the first teeth at the same radial position by a method other than by forming the grooves in the second teeth (e.g., by forming holes in the second teeth).

The first and second embodiments are described with respect to an example in which the grooves are formed in the radially outer parts of the second teeth. However, the present disclosure is not limited to this. For example, the grooves may be formed in the radially inner parts of the second teeth other than the tip ends thereof.

Figure 12:
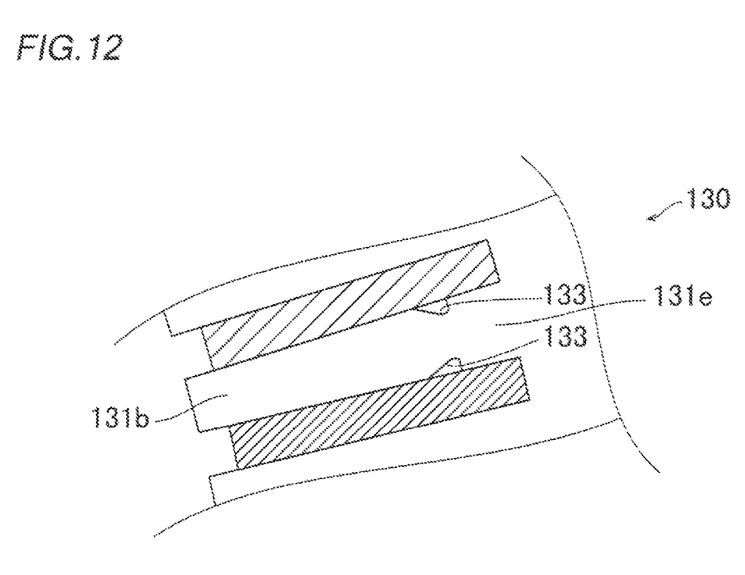
FIG. 12 is a top view of a rotating electrical machine according to a first modification of the first embodiment of the present disclosure.

The first and second embodiments are described with respect to an example in which the grooves are formed in the root parts of the second teeth which are located on the radially outer side of the second teeth. However, the present disclosure is not limited to this. For example, as in a rotating electrical machine 130 of a first modification shown in FIG. 12, grooves 133 may be formed in those parts of second teeth 131*b* which are located radially inside root parts 131*e* thereof.

The first and second embodiments are described with respect to an example in which the coils are concentric winding coils formed by rectangular wires. However, the present disclosure is not limited to this. For example, the coils may be formed by wires other than rectangular wires, such as round wires. The coils may be formed by a winding method other than concentric winding.

Figure 13:
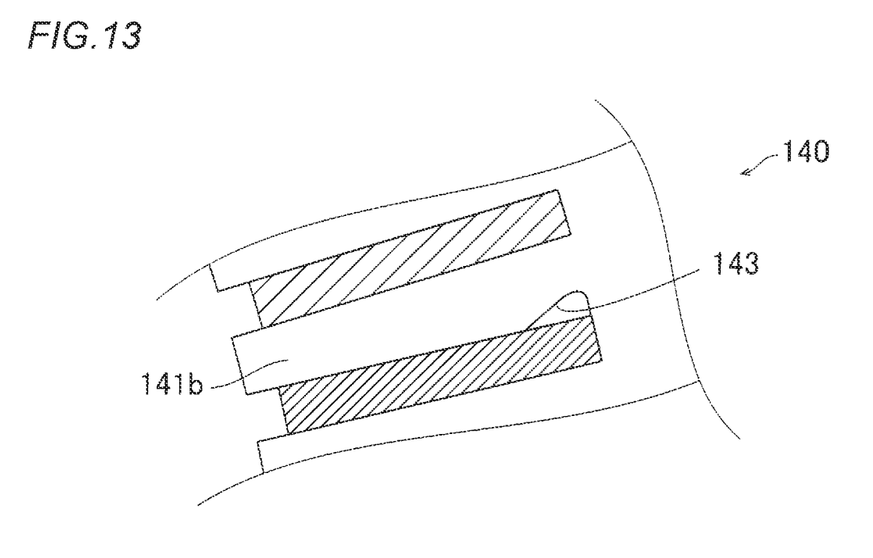
FIG. 13 is a top view of a rotating electrical machine according to a second modification of the first embodiment of the present disclosure.

The first and second embodiments are described with respect to an example in which the grooves are formed on one side and the other side in the circumferential direction of the second teeth as viewed in the rotation axis direction. However, the present disclosure is not limited to this. For example, as in a rotating electrical machine 140 of a second modification shown in FIG. 13, grooves 143 may be formed only on one side in the circumferential direction of second teeth 141*b*.

The first embodiment is described with respect to an example in which the grooves are formed so as not to extend in the back yoke and so as to extend through the stator core from one end face to the other end face in the rotation axis direction of the stator core as viewed in the rotation axis direction. However, the present disclosure is no limited to this. For example, the grooves may be formed so as not to extend in the back yoke and so as not to extend through the stator core from one end face to the other end face in the rotation axis direction of the stator core.

The first and second embodiments are described with respect to an example in which the grooves are formed so that the circumferential width of the groove gradually increases as it gets farther away from the radially inner side and closer to the radially outer side of the groove (so that the grooves have a substantially triangular shape), as viewed in the rotation axis direction. However, the present disclosure is not limited to this. For example, the grooves may be formed so as to have a shape other than the substantially triangular shape (a substantially rectangular shape, a substantially semicircular shape) as viewed in the rotation axis direction.

Figure 14:
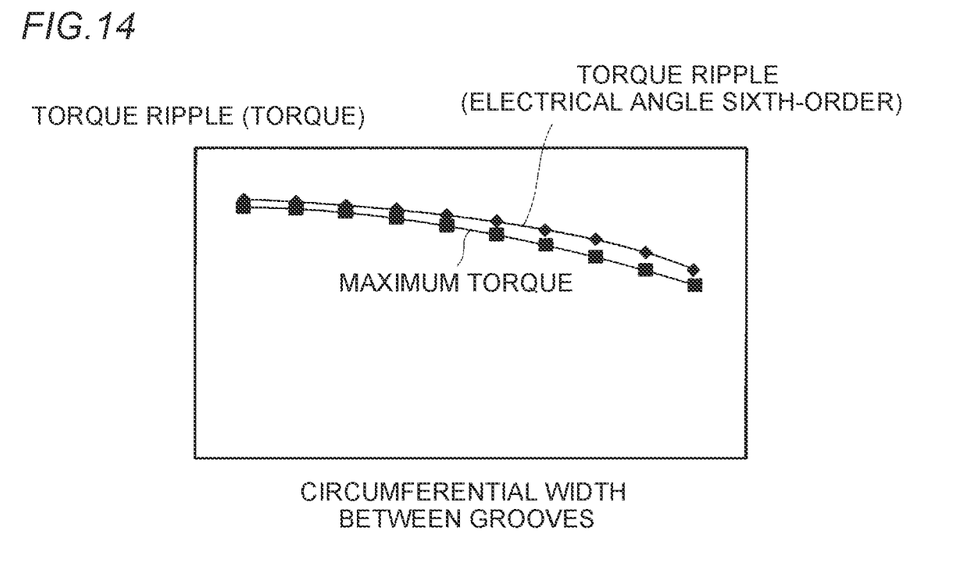
FIG. 14 is a diagram showing the relationship between the circumferential width of grooves and the torque ripple and maximum torque.

The first and second embodiment are described with respect to an example in which, in each of those parts of the second teeth which have the grooves, the circumferential width W3 (see FIG. 3) of the part of the second tooth which has the grooves is equal to or larger than the circumferential width W4 of the tip end located on the radially inner side of the second tooth, as viewed in the rotation axis direction. However, the present disclosure is not limited to this. As shown in FIG. 14, the larger the circumferential width W3 between the grooves is (to the right on the abscissa of FIG. 14), the lower the torque ripple and the maximum torque are. The larger the circumferential width W3 between the grooves is, the larger the difference between the torque ripple and the maximum torque is. The circumferential width W3 between the grooves may be determined so as to obtain desired torque ripple and desired maximum torque, based on FIG. 14.

The invention claimed is:

1. A rotating electrical machine, comprising:
   a rotor core having a permanent magnet placed therein;
   a stator core placed so as to face the rotor core in a radial direction and including a plurality of teeth and a plurality of slots each located between adjacent ones of the teeth; and
   a plurality of coils placed in the slots of the stator core, wherein
   the plurality of teeth include a first tooth having the coils of the same phase placed in the slots adjoining one side and the other side in a circumferential direction of the first tooth, and a second tooth having the coils of different phases placed in the slots adjoining one side and the other side in the circumferential direction of the second tooth,
   a circumferential width of at least a part of such a portion of the second tooth that forms a magnetic path other than an opposing portion of the second tooth which faces the rotor core is smaller than a circumferential width of the first tooth at the same radial position,
   a groove is formed in a slot-side side surface of the second tooth so as to extend in a rotation axis direction,
   the groove is not formed in the first tooth but is formed in the second tooth, and a circumferential width of the second tooth at a radial position of a part of the second tooth which has the groove is smaller than a circumferential width of the first tooth at the same radial position, and
   an opposing portion facing the rotor core of the first tooth and the opposing portion facing the rotor core of the second tooth have substantially the same shape.

2. The rotating electrical machine according to claim 1, wherein
   the groove is formed in a radially outer part of the second tooth.

3. The rotating electrical machine according to claim 2, wherein
the coil is formed by a rectangular wire,
the slot in which the coil formed by the rectangular wire is placed has a circumferential width that is substantially uniform from a radially inner side to a radially outer side of the slot,
the tooth adjoining the slot whose circumferential width is substantially uniform from the radially inner side to the radially outer side of the slot has a circumferential width that increases from a radially inner side toward a radially outer side of the tooth, and
in the part of the second tooth which has the groove, the circumferential width of the part of the second tooth which has the groove is equal to or larger than a circumferential width of the opposing portion of the second tooth which is located on a radially inner side of the second tooth, as viewed in the rotation axis direction.

4. The rotating electrical machine according to claim 3, wherein
the groove is formed on both one side and the other side in the circumferential direction of the second tooth as viewed in the rotation axis direction.

5. The rotating electrical machine according to claim 4, wherein
the stator core further includes a back yoke located on a radially outer side of the stator core,
the teeth are formed so as to extend radially inward from the back yoke, and
the groove is formed in a root part of the second tooth which connects to the back yoke, and is formed so as not to extend in the back yoke as viewed in the rotation axis direction.

6. The rotating electrical machine according to claim 5, wherein
the groove is formed in the root part of the second tooth which connects to the back yoke, and is formed so as not to extend in the back yoke as viewed in the rotation axis direction and so as to extend through the stator core from one end face to the other end face in the rotation axis direction of the stator core.

7. The rotating electrical machine according to claim 6, wherein
the groove is formed so that a circumferential width of the groove gradually increases from a radially inner side toward a radially outer side of the groove, as viewed in the rotation axis direction.

8. The rotating electrical machine according to claim 4, wherein
the stator core further includes a back yoke located on a radially outer side of the stator core,
the teeth are formed so as to extend radially inward from the back yoke, and
the groove is formed in a root part of the second tooth which connects to the back yoke, and is formed so as to extend in the back yoke as viewed in the rotation axis direction.

9. The rotating electrical machine according to claim 8, wherein
the groove is formed in the root part of the second tooth which connects to the back yoke, and is formed so as to extend in the back yoke as viewed in the rotation axis direction and so as not to extend through the stator core from one end face to the other end face in the rotation axis direction of the stator core.

10. The rotating electrical machine according to claim 1, wherein
the coil is formed by a rectangular wire,
the slot in which the coil formed by the rectangular wire is placed has a circumferential width that is substantially uniform from a radially inner side to a radially outer side of the slot,
the tooth adjoining the slot whose circumferential width is substantially uniform from the radially inner side to the radially outer side of the slot has a circumferential width that increases from a radially inner side toward a radially outer side of the tooth, and
in the part of the second tooth which has the groove, the circumferential width of the part of the second tooth which has the groove is equal to or larger than a circumferential width of the opposing portion of the second tooth which is located on a radially inner side of the second tooth, as viewed in the rotation axis direction.

11. The rotating electrical machine according to claim 1, wherein
the groove is formed on both one side and the other side in the circumferential direction of the second tooth as viewed in the rotation axis direction.

12. The rotating electrical machine according to claim 1, wherein
the stator core further includes a back yoke located on a radially outer side of the stator core,
the teeth are formed so as to extend radially inward from the back yoke, and
the groove is formed in a root part of the second tooth which connects to the back yoke, and is formed so as not to extend in the back yoke as viewed in the rotation axis direction.

13. The rotating electrical machine according to claim 1, wherein
the stator core further includes a back yoke located on a radially outer side of the stator core,
the teeth are formed so as to extend radially inward from the back yoke, and
the groove is formed in a root part of the second tooth which connects to the back yoke, and is formed so as to extend in the back yoke as viewed in the rotation axis direction.

14. A stator, comprising:
a stator core that is placed so as to face in a radial direction a rotor core having a permanent magnet placed therein and that includes a plurality of teeth and a plurality of slots each located between adjacent ones of the teeth; and
a plurality of coils placed in the slots of the stator core, wherein
the plurality of teeth include a first tooth having the coils of the same phase placed in the slots adjoining one side and the other side in a circumferential direction of the first tooth, and a second tooth having the coils of different phases placed in the slots adjoining one side and the other side in the circumferential direction of the second tooth,
a circumferential width of at least a part of such a portion of the second tooth that forms a magnetic path other than an opposing portion of the second tooth which faces the rotor core is smaller than a circumferential width of the first tooth at the same radial position, a groove is formed in a slot-side side surface of the second tooth so as to extend in a rotation axis direction, the groove is not formed in the first tooth but is formed in the second tooth, and a circumferential width of the second tooth at a radial position of a part of the second tooth which has the groove is smaller than a circumferential width of the first tooth at the same radial position, and an opposing portion facing the rotor core of the first tooth and the opposing portion facing the rotor core of the second tooth have substantially the same shape.

* * * * *